United States Patent [19]

Pirooz

[11] 3,902,881

[45] Sept. 2, 1975

[54] METHOD OF FORMING AN OPALESCENT ARTICLE HAVING A COLORED BULK AND AT LEAST ONE SURFACE STRATA OF A DIFFERENT COLOR THAN THE BULK

[75] Inventor: Perry P. Pirooz, Toledo, Ohio

[73] Assignee: Owens-Illinois, Inc., Toledo, Ohio

[22] Filed: June 4, 1971

[21] Appl. No.: 150,188

[52] U.S. Cl. ............... 65/30; 65/32; 106/52; 106/54
[51] Int. Cl.² ... C03C 3/04; C03C 3/08; C03C 3/20; C03C 23/00
[58] Field of Search ....... 106/54, 52, 39 DY; 65/32, 65/30, 33; 161/193, 1

[56] References Cited
UNITED STATES PATENTS

| | | | |
|---|---|---|---|
| 3,275,492 | 9/1966 | Herbert | 106/39 DV |
| 3,370,948 | 2/1968 | Rosenbauer | 65/30 |
| 3,413,133 | 11/1968 | Stalego | 106/50 |
| 3,420,645 | 1/1969 | Hair | 106/52 |
| 3,429,742 | 2/1969 | Grego et al. | 65/32 |
| 3,464,806 | 9/1969 | Seki et al. | 65/32 |
| 3,495,964 | 2/1970 | Hares et al. | 65/30 |

FOREIGN PATENTS OR APPLICATIONS 6,605,388  10/1967  Netherlands............. 106/39 DV

OTHER PUBLICATIONS

Berezhoni, A. I.; Colored Glass–Ceramics in Glass–Ceramics and Photo–Sitalles, New York, 1970, pp. 262–266, [TP806B4].

Primary Examiner—Patrick P. Garvin
Assistant Examiner—Mark Bell
Attorney, Agent, or Firm—Howard G. Bruss, Jr.; E. J. Holler

[57] ABSTRACT

A glass article composed of silica and a coloring ion selected from Co, Ni, Cu, Sn, Sb, and Pb is subjected to a specified heat cycle, at least a portion of which is in a reducing atmosphere, to cause coloration of the bulk of the article and form at least one strata at the surface of the article which has a color different from that of the bulk. By selectively removing a portion of the strata multi-colored glass article is formed.

1 Claim, No Drawings

METHOD OF FORMING AN OPALESCENT ARTICLE HAVING A COLORED BULK AND AT LEAST ONE SURFACE STRATA OF A DIFFERENT COLOR THAN THE BULK

This invention relates to multi-colored glass articles and methods of making same. More particularly, this invention relates to glass articles formed by heat treatment in a reducing atmosphere which causes at least one strata to be formed in situ in the glass of a different color than the bulk.

It is known that glass articles may be multi-color decorated by coating a bulk colored article with a layer of a different color. By selectively applying this layer to predetermined areas, a design is formed. Such coating techniques while useful, are not always durable since the coating layer is usually in some way or to some degree incompatible with the bulk glass. Thus, when the article is subjected to chemical, thermal, and/or mechanical stresses during use, the coating tends to chip, or otherwise separate, from the bulk glass. Such articles are therefore said to lack durability.

Many techniques have been proposed to solve this durability problem. One such technique is exemplified by U.S. Pat. Nos. 2,428,600 and 3,429,742. In the former patent, a hot alkali metal oxide glass surface is contacted with cupric or cuprous halides. At the elevated temperatures employed, copper ions are caused to exchange with the alkali metal ions of the glass surface. The copper ions now in the glass surface are then reduced in a hydrogen atmosphere to form a red surface color in situ in the glass structure. In the latter patent, a soda-lime glass has applied to its surface a copper staining paste. The coated surface is initially heated to about 425°–475°C in a mild reducing atmosphere to exchange copper ions for alkali metal ions in the glass. The glass is then heated to about 450°–500°C in a hydrogen atmosphere to blacken the surface and thereafter to 600°–650°C to convert the blackened surface to a red colored surface layer in situ of the glass structure.

While this ion exchange technique forms a colored layer within the structure of the glass and thus, to some extent, alleviates the problem of durability attendant with the separate coating technique, it is not altogether satisfactory since it gives rise to many of its own problems. For example, high design resolution is not always possible and the ion exchange step is often time-consuming and expensive, especially where sufficient depths of exchange for relatively good durability became necessary. In addition, the exchange of a copper ion for an alkali metal ion in the surface of the glass, especially if conducted at temperatures below the strain point of the glass, often set up stresses in the glass article which are or may be undesirable. As a further drawback to this ion exchange technique is the fact that the coloring takes place only in the surface, thus rendering it necessary to perform an initial separate coloring step if the bulk is to have a color in addition to the surface layer.

Another technique used by the prior art to form a colored glass article having improved durability over that of the coating technique, is to heat treat a glass article containing coloring ions in its bulk, in a reducing atmosphere to develop an outwardly appearing colored article either because color has been developed throughout the bulk of the glass or it has been developed only in a surface layer thereof. For example, U.S. Pat. No. 402,090 discloses heating a glass article of unspecified composition, except that it contains metallic constituents, in fumes of sulfur to produce a metallic luster on the surface. U.S. Pat. No. 2,339,928, on the other hand, discloses a technique for coloring glass fibers, presumably throughout their bulk, by including within the glass fiber compositions coloring ions of Pb and Cu and subsequently heat-treating the article in a reducing atmosphere.

While this latter approach improves durability by forming color in situ of the glass structure and without external additions thereto, it has the serious drawback of forming but a single color over and/or throughout the structure and not selective to external portions only thereof. By forming only a single color over and/or throughout the structure one is relegated to an initial separate coloring step and thereafter the use of a surface technique (e.g., coated colored layer or ion exchange paste) if multi-colors are to be achieved.

Other techniques have been developed for various purposes in the art not directly related to durability or coloring but which may inherently color a glass article. For example, U.S. Pat. No. 3,460,927 discloses an important process for strengthening a glass article by internally changing the valence of at least one chemical element in the surface of the glass to a lower valence state. By so doing, usually by heating the article in a reducing atmosphere at a temperature below the strain point, a compression stress is set up in the surface, thus tempering the article. As disclosed, some of the chemical elements employed may be coloring agents. However, as shown in Example I of this patent, treatment in a reducing environment decolors rather than colors the surface of the initially purple glass. Thus, in fact, only the formation of a single color is disclosed.

In view of the above, it is apparent that there exists a need in the art for a new process of forming colored glass articles which incorporates the durability aspects of in situ coloration, but at the same time, develops several colors within the structure such that the structure may have artwork designed therein without the addition of externally applied coatings. It is a purpose of this invention to fulfil this need in the art.

Generally speaking, this invention fulfills the above-described need in the art by providing a glass article comprised of a silica-containing base glass having therein a coloring ion selected from Co, Ni, Cu, Sn, Sb, Pb and mixtures thereof which when heat treated at an elevated temperature in a reducing environment will form, in situ, a colored bulk glass having at least one surface strata of a different color than the bulk. In certain preferred embodiments of this invention, and by selection of the appropriate heat treatment, more than one and at times three or more differently colored surface strata will be formed in situ within the glass structure. Once such an article is formed, selective design work may be provided in its surface by removing various sections of a given strata to provide a contrasting color design with the different colors; either of another strata or of the bulk in connection therewith.

As can be seen, durability is achieved by this invention since an in situ technique is used without the aid of any externally applied colored coating layers. In addition, external ion exchange is not employed and thus the problems attendant with that technique are eliminated. Furthermore, economy is realized simultaneously with the ability to form durable art work in the article since at least two colors are formed during simple heat treatment of the glass structure.

While many silica-containing base glass compositions may be employed for the purposes of this invention, several of which are well known in the art, not all glasses will achieve the desired results contemplated by this invention. The primary requirement of any base glass composition employed is that when it is formed into a glass article with the above-indicated coloring ions present therein, usually in oxide form, it must be capable of forming under heat treatment a colored bulk and at least one separately colored surface layer. While not wishing to be limited to any particular theory, it is believed that the base glass composition used must be of such a nature that it provides sufficient mobility for the coloring ions to migrate to the surface area of the glass article during heat treatment such that at least one color is formed at the surface, and at the same time, retards mobility to a sufficient degree or is capable of internally acting or reacting in another manner such that the bulk of the article will turn a different color during this heat treatment.

A particularly preferred type of base glass for the purposes of this invention includes those glasses of the aluminosilicate type and particularly of the calcia-aluminosilicate type. Such glasses may remain vitreous or may crystallize during heat treatment. Further, the glasses may be non-opalizing or they may be opal glasses either of the crystalline type or by the fact that they have present in their structure an immiscible, liquid phase dispersed in a glassy matrix. Generally speaking such base glasses will be comprised of about the following constituents on a theoretical oxide basis:

| Constituent | % by weight |
| --- | --- |
| $SiO_2$ | 50 – 80 |
| $Al_2O_3$ | 1 – 15 |
| $B_2O_3$ | 0 – 15 |
| CaO | 1 – 20 |
| MgO | 0 – 15 |
| $R_2O$ | 0 – 13 | wherein R is an alkali metal ion. Other compatible oxides such as $ZrO_2$, CdO, $P_2O_5$, ZnO, and the like may be present. However, it is preferred that the base glass composition, exclusive of coloring agent, consist of at least 85% by weight of the oxides listed in the above table.

When base glasses of this type are employed, their batch ingredients are usually admixed with about 0.2 –7% (based upon the total glass batch composition) of one of the indicated coloring agents in oxide form. Since such glasses only color under reducing conditions, the batch ingredients, including the coloring agent, may be melted and refined by conventional techniques in oxidizing (e.g., air) or neutral environments to form a molten, substantially clear, glass which is thereafter shaped into the desired article and heat treated as hereinafter more fully described to develop at least two colors therein.

Several of the glasses employed for the purposes of this invention within the above-described range of ingredients are believed to function solely because of coloring-ion migration since they remain substantially transparent during heat treatment while providing different colors between the bulk and at least one surface strata. On the other hand, several other glasses within the above-described range of ingredients are believed to function by a combination of coloring-ion migration and opalization of the glass bulk. At other times, a particular glass, simply by choice of heat treatment, may serve the purposes of this invention either by coloring migration alone and thereby remain transparent, or by a combination of ion migration and opalization.

A particularly preferred type of base glass to which coloring ions may be added for the purposes of this invention is disclosed in Belgian Pat. No. 729,317 issued May 14, 1969. The entire disclosure of this patent is incorporated herein by reference.

The glasses of this Belgian patent usually opalize at the temperatures of heat treatment contemplated by this invention and in accordance with the teachings of this patent will bulk color during opalization if colorant oxides such as those contemplated by this invention are added thereto. The glasses of this patent may be characterized for the purposes of this invention as being comprised of the following ingredients:

| Constituent | Broad Range | Preferred Range |
| --- | --- | --- |
| $SiO_2$ | 55 – 76 | 60 – 70 |
| $Al_2O_3$ | 1.5 – 12 | 4 – 8 |
| $B_2O_3$ | 0 – 14 | 1 – 9 |
| CaO | 5 – 20 | 6 – 16 |
| MgO | 0 – 15 | 4 – 12 |
| $Na_2O$ | 0 – 11 | 3 – 7 |
| $K_2O$ | 0 – 5 | 0 |
| $Li_2O$ | 0 – 2 | 0 | wherein

| | | |
| --- | --- | --- |
| (CaO + MgO) | 10 – 30 | 14 – 21 |
| ($Na_2O$ + $K_2O$) | 0 – 11 | <8 |
| wt. % $B_2O_3$ | 0 – 5 | 0.2 – 3 |
| wt. % $Na_2O$ | | |
| ($SiO_2$ + $Al_2O_3$ + $B_2O_3$ + CaO + MgO + $Na_2O$ + $K_2O$) | >95 | >98 |

Another particularly preferred type of base glass to which coloring ions may be added for the purposes of this invention is disclosed in my commonly owned copending application Ser. No. 29,290, filed Apr. 16, 1970 now abandoned. The entire disclosure of this application is incorporated herein by reference.

The opal glasses of this copending application are of such a nature that the final product formed is a highly durable, stain-resistant product. These glasses may be characterized for the purposes of this invention as being comprised of the following ingredients:

| Constituent | Wt. % |
| --- | --- |
| $SiO_2$ | 62–72 |
| $B_2O_3$ | 10–14 |
| RO | 10–15 |
| $R_2O$ | 1–4 |
| $Al_2O_3$ | 2–8 |
| STO | effective amt. (e.g. about 0.2–8%) | wherein RO is MgO or CaO or a mixture thereof, wherein $R_2O$ is at least one member selected from the group consisting of $Na_2O$ and $K_2O$, and wherein STO is a durability-improving, stain-inhibiting oxide selected from $P_2O_5$, $ZrO_2$, ZnO, $SnO_2$, CdO, BaO, PbO and mixtures thereof. In those instances, of course, where the durability-improving, stain-inhibiting oxide is also a colorant in accordance with this invention, the base glass composition of this invention also constitutes the final glass composition since no addition of colorant usually becomes necessary.

A still further preferred type of base glass for the purposes of this invention consists essentially of by weight about: 62–69% $SiO_2$, 4–8% $Al_2O_3$, 10–15% CaO + MgO, 4–6% $Na_2O$, and 6–12% $B_2O_3$. These glasses are preferred because they may be made either multicolored transparent or multicolored opalescent merely by choice of the appropriate heat treatment.

Glass colorants known to the art and useful in this invention are generally categorized as multivalent metal ions. while there may be exceptions as different glasses within the above-described ranges are used, generally speaking, not all multi-valent metal ions are capable of developing two or more colors in a glass when employed as the coloring ion of this invention. In fact, for most glasses contemplated, only Co, Ni, Cu, Sn, Sb and Pb perform sufficiently well to be considered as truly effective. Of these, Sn, Sb, and Pb are less desirable since the concentrations required to give the desired results are relatively high. Thus, Co, Ni, and Cu colorants are preferred for the purposes of this invention. These colorants are usually present in or added to the base glass batch in their oxide form.

This is not to say, however, that other known multi-valent ions are not useful to aid in color development, quality, type and the like. Many other multivalent ions known as coloring ions may be employed as color aids. For example, while for most glasses of this invention, multi-colors are not formed when they are employed alone, the oxides of $Fe_2O_3$, $Cr_2O_3$, $Au_2O_3$, $MnO_2$, $MoO_3$, and $V_2O_5$ may be employed to effect the specific color finally obtained. Generally speaking, such oxides may be employed up to about 1% of the total glass composition.

For most purposes of this invention, and regardless of whether the primary colorants are used alone or in combination with the secondary multi-valent coloring aids listed above, they are usually employed in amounts of about 0.2–7% by weight of the total glass composition. Most preferably, CuO is employed in amounts less than about 5% by weight while the others are employed in amounts less than about 1% by weight of the total glass composition. These ranges are merely guidelines since they may vary widely depending upon the results sought to be achieved.

Once the glass articles of the above-described compositions have been formed using conventional techniques, they are subjected to a specified heat treatment so as to develop therein a bulk color and at least one surface or subsurface strata having a color different from that of the bulk. While the exact heat treatment for any particular glass may vary over a wide range to achieve the desired result, generally speaking, such a heat treatment comprises heating the article in a reducing environment at a temperature of about 475°–950°C for from about 15 minutes to 48 hours to develop the colored layer or layers and differently colored bulk.

The actual heat treatment employed may be done in a single step or in a multi-step operation. For example, in those instances where the multi-colored article developed is not to be opacified as by opalization, the entire heat treatment may be effected in a single step in a reducing environment at relatively low temperatures.

In those instances where opalization is to be effected, the heat treatment must be carried out at the relatively higher temperatures at which opalization will occur, usually about 700°C or more. This heat treatment can still be effected in a single step under reducing conditions if so desired since opalization and strata color formation will occur at these higher temperatures. A preferred technique, however, and especially where expensive and dangerous $H_2$-containing gases are employed for the reducing environment, is to first heat the article in a non-reducing environment such as air, to relatively high temperatures and thereby initially effect bulk opalization and thereafter lower the temperature and use a reducing environment to form the surface strata of a color different than the bulk. By this latter multi-step approach the expense and danger of employing an $H_2$ environment and the special equipment attendant therewith are minimized.

Any conventional reducing environment can be employed for the purposes of this invention, examples of which include $H_2$, water vapor, forming gas (e.g. 90% $N_2$ + 10% $H_2$), methane, natural gas, carbon monoxide, and the like. Of these, $H_2$ and forming gas are preferred and have proved most effective.

Once the colored strata and bulk have been developed, the article may be decorated by removing selected portions of the surface thereof so as to present for outward viewing contrasting colors. Removal of selected portions of the surface of the article may be effected in any conventional manner for removing surface glass such as by etching or grit-blasting.

In a typical selective etching technique useful for the purposes of this invention, the artwork desired may be reproduced on the glass by conventional screen-printing using an acid resist and subsequently etching with a mixture of hydrofluoric and sulfuric acid solution for successive dips of 60 and 30 seconds duration. In a typical selected grit-blasting technique, the artwork desired is transferred to the glass by conventional screen-printing using a resinous resist. Thereafter, the surface layer in the unprotected areas are selectively removed by grit-blasting to a depth necessary to expose the contrasting colors (usually on the order of about 5 mils). In both techniques excellent design resolution is achieved. Of these two techniques, grit-blasting is preferred.

The following examples are presented by way of illustration rather than limitation.

EXAMPLE 1.

The following batch ingredients were melted in a platinum crucible using an electric furnace at 2800°F for a period of 26 hours. The melt was continuously stirred to assure homogeneity. A good quality glass was produced which was then cast and annealed at 1200°F for two hours.

| Ingredient | Batch Grams | Oxide | Theoretical Comp. of Glass Wt. % |
|---|---|---|---|
| Ottawa Sand | 3110.11 | $SiO_2$ | 62 |
| A-10 Alumina | 299.36 | $Al_2O_3$ | 6 |
| Calcium Carbonate | 623.56 | CaO | 7 |
| Magnesium Oxide | 256.48 | MgO | 5 |
| Sodium Borate | 591.58 | $Na_2O$ | 5 |
| Sodium Nitrate | 6.86 | $B_2O_3$ | 8 |
| Cupric Oxide | 250.44 | CuO | 5 |

| Ingredient | Batch Grams | Theoretical Comp. of Glass Oxide | Wt. % |
|---|---|---|---|
| Manganese dioxide | 100.08 | MnO₂ | 2 |
| Sodium carbonate | 121.00 | No₃ | (equivalent) to 1% of the Na₂O was added as NaNO₃ |

The glass slab was heated up to 700°C in air, held for 24 hours, raised to 750°C in air, held for 24 hours to thereby effect bulk opalization. The article was then cooled to 500°C and held for ½ hour in forming gas (90% N₂ + 10% H₂) and then cooled to room temperature. The heat treatment produced a succession of four color layers: metallic coppertone, reddish brown, bluish-green and red followed by a green bulk. By selective removal of portions of the various layers formed using conventional grit-blasting techniques as described above, a multi-color design is produced.

EXAMPLE 2.

Small drinking glasses (tumblers) were produced by melting the following batch in a platinum crucible in an electric furnace at 2800°F for 20 hours with continuous stirring and then blowing the resultant glass into a steel mold to form the tumblers with subsequent annealing at 1200°F.

| Ingredient | Batch Grams | Theoretical Comp. Oxide | Wt. % |
|---|---|---|---|
| Ottawa Flint Sand | 3458.6 | SiO₂ | 69.0 |
| A-10 alumina | 324.6 | Al₂O₃ | 6.5 |
| Raw Dolomite | 1106.8 | CaO | 6.7 |
| Borax | 580.5 | MgO | 4.8 |
| Cupric Oxide | 10.0 | Na₂O | 5.0 |
| Soda Ash | 123.8 | B₂O₃ | 8.0 |
| Boric Anhydride | 20.0 | CuO | 0.2 |

Several of the tumblers were opacified by heating them in air at 780°C for 2 hours and thereafter were rendered multi-colored by cooling them to 650°C and holding them at this temperature for one hour in forming gas and then cooling to room temperature. The tumblers were opaque blue in the bulk and opaque red at their surface.

The remaining tumblers were formed into transparent, non-opaque articles by heating them in a single step at 650°C for 2 hours in forming gas and then cooling to room temperature. The treatment produced a transparent blue glass having a transparent ruby-red surface strata therein.

In either instance, the tumblers were readily decorated by either grit-blasting to a depth of 5 mils using a screen-printed resin resist as the mask or by acid etch as described above. In both cases the reproduction of the art work was achieved with excellent results.

EXAMPLE 3.

Glass spheres were formed from the following batch ingredients by melting in a crucible at 2800°F in an electric furnace over a 20 hour period, blowing the spheres from the so formed glass and annealing them at 1200°F.

| Ingredient | Batch Grams | Theoretical Comp. Oxide | Wt. % |
|---|---|---|---|
| Ottawa Flint Sand | 3350.8 | SiO₂ | 68.4 |
| A-10 Alumina | 296.1 | Al₂O₃ | 6.0 |
| Dolomite Lime | 581.2 | CaO | 7.0 |
| Soda Ash | 426.9 | MgO | 4.9 |
| Borate Frit | 787.7 | Na₂O | 5.0 |
| Cupric oxide | 19.9 | B₂O₃ | 8.3 |
| | | CuO | 0.4 |

The spheres were heated to 800°C and held at this temperature for 1 hour in forming gas and then cooled to room temperature. The resulting spheres were colored a dark red on the surface and a blue in the bulk and were opaque throughout. The spheres were decorated as described in Example 2.

EXAMPLE 4.

Articles were made from the following two batches melted at 2800°F in an electric furnace for 20 hours, the resulting glass being shaped in accordance with conventional techniques.

| Ingredient | Batch A (Gms) | Batch B (Gms) |
|---|---|---|
| Ottawa Flint Sand | 3431.9 | 3431.9 |
| A-10 Alumina | 295.4 | 295.4 |
| Dolomite Lime | 1137.3 | 1137.3 |
| Soda Ash | 427.1 | 427.1 |
| Boric Anhydride | 418.5 | 418.5 |
| Cobalt Oxide (Co₂O₃) | 21.7 | — |
| Nickel Oxide | — | 19.9 |

The theoretical oxide composition of the glasses so formed is as follows:

| Oxide | A (wt. %) | B (Wt. %) |
|---|---|---|
| SiO₂ | 68.5 | 68.5 |
| Al₂O₃ | 6.0 | 6.0 |
| CaO | 7.0 | 7.0 |
| MgO | 4.9 | 4.9 |
| Na₂O | 5.0 | 5.0 |
| B₂O₃ | 8.3 | 8.3 |
| CoO | 0.4 | — |
| NiO | — | 0.4 |

The articles were heated in forming gas at 800°C for 2 hours. The resulting articles were opaque throughout, Glass A was blue in bulk with a gray surface strata while Glass B was tan in bulk with a brown surface strata. Both are decoratable by the techniques of Example 2.

Once given the above disclosure, many other features, modifications and improvements will become apparent to the skilled artisan. Such other features, modifications and improvements are thus considered a part of this invention, the scope of which is to be determined by the following claims.

I claim:

1. An apalescent method of forming a glass article comprised of a silica-containing base glass consisting essentially of by weight about: 50–80% SiO₂, 1–15% Al₂O₃, 0–15% B₂O₃, 1–20% CaO, 0–15% MgO, and 0–13% R₂O wherein R is an alkali metal ion, and having therein a coloring ion selected from Co, Ni, Cu, Sn, Pb and mixtures thereof, said glass article having a colored bulk glass and at least one surface strata of a different color than the bulk, said method comprising; heating said article to a temperature and for a sufficient period of time sufficient to form, in-situ, a colored bulk glass and at least one surface strata of a different color than the bulk, said heating taking place in at least two steps, the first step being at the opacification temperature of said article and the second step being conducted at a temperature lower than said first step and wherein only the second step is carried out in a reducing atmosphere, said resulting article being opaque.

* * * * *